United States Patent [19]
Ridings

[11] 3,996,690
[45] Dec. 14, 1976

[54] COMBINATION INSECT TRAP AND SWATTER DEVICE
[76] Inventor: Ronald W. Ridings, P.O. Box 185, Coburg, Oreg. 97401
[22] Filed: Jan. 9, 1976
[21] Appl. No.: 647,744
[52] U.S. Cl. .................................. 43/65; 43/110; 43/134; 43/137
[51] Int. Cl.² .................. A01M 23/08; A01M 3/02
[58] Field of Search ........... 43/134, 135, 136, 137, 43/115, 65, 121, 122, 110

[56] References Cited
UNITED STATES PATENTS

| 210,163 | 11/1878 | Steinmetz | 43/134 |
| 861,963 | 7/1907 | Fyfe | 43/134 |
| 1,473,538 | 11/1923 | Bakke | 43/110 |
| 2,189,360 | 2/1940 | Haviland | 43/135 |
| 2,250,894 | 7/1941 | Metter | 43/110 |
| 2,545,215 | 3/1951 | Sharpe | 43/137 |

Primary Examiner—Warner H. Camp
Attorney, Agent, or Firm—James D. Givnan, Jr.

[57] ABSTRACT

A receptacle in which an insect attracting substance is placed, the receptacle including a top surface having a fly trap appendage for trapping insects therewithin. A yieldable arm arrangement supports a swatter above the top surface of the receptacle enabling the user to swat insects by manually depressing the uppermost arm. A tray like member is moveably mounted within the receptacle for periodic emptying of the receptacle and the resupplying of an insect attractor.

6 Claims, 3 Drawing Figures

COMBINATION INSECT TRAP AND SWATTER DEVICE

BACKGROUND OF THE INVENTION

The present device relates generally to that class of devices including insect traps, fly swatters and the like for the destruction of flies and other insects.

Well known in the prior art are fly swatters and insect traps. For the most part such devices have been considered separately and have overlooked the advantages of a combined trap and swatter arrangement.

SUMMARY OF THE INVENTION

The present invention is embodied in a device providing for both swatting or trapping of an insect and includes a receptacle within which may be placed an insect attractor.

The receptacle defines a passageway for the entry of insects and includes a moveable component permitting periodic removal of dead insects from the receptacle. Swatter means are disposed above the top surface of the receptacle and may be urged into forceful contact with said plate for insect killing purposes. Arm means interconnect the swatter and receptacle in a yieldable manner permitting manual pressure to forcefully close the swatter against the receptacle top surface. The moveable component of the receptacle may be embodied within a tray within which an insect attracting substance is placed with fumes from the insect attractor escaping through the perforate top wall of the receptacle.

Important objects of the present device include: the provision of a combination insect trap and swatter which may function simply as an insect trap or alternatively as a swatter when in place on a supporting surface; the provision of a combination insect trap and swatter receiving a quantity of insect attractor within a moveable component of the receptacle which component may be in the form of a tray for the collection of dead insects; the provision of a combination insect trap and swatter which lends itself to low cost production methods, yet one of durable, trouble free construction.

These and other objects will become apparent upon a reading and understanding of the following description of the device.

BRIEF DESCRIPTION OF THE DRAWING

In the accompanying drawing.

DETAILED DESCRIPTION OF THE PREFERRED EMBODIMENT

Figure 1:
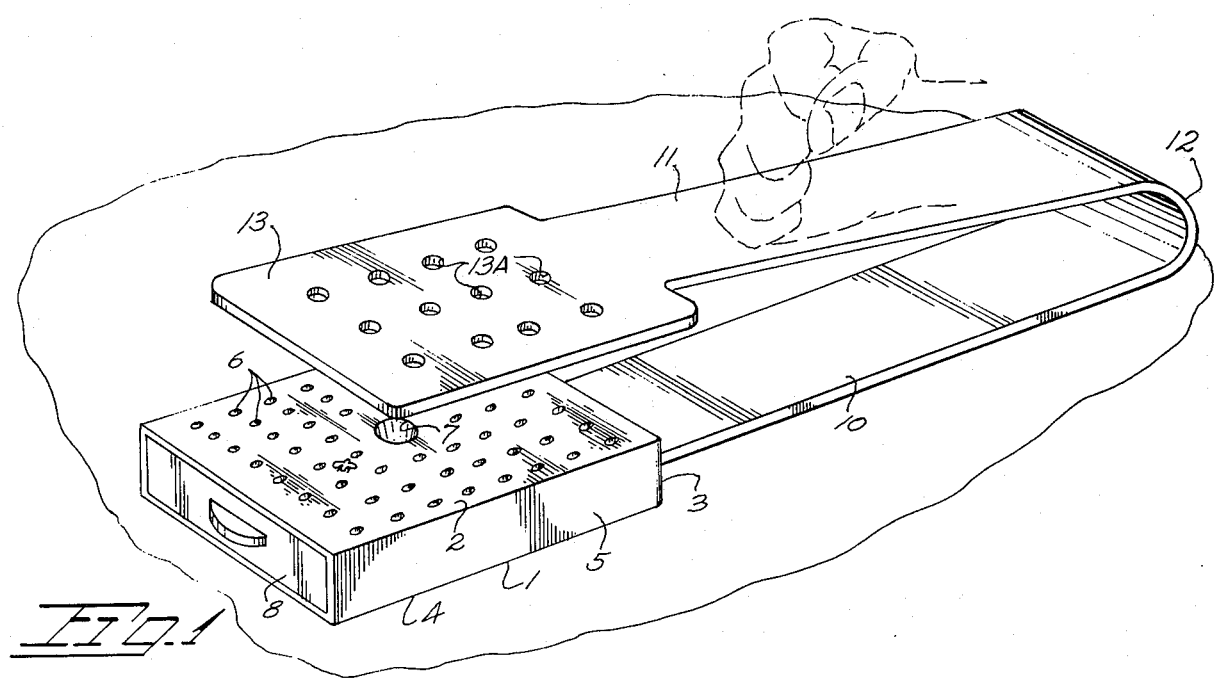
FIG. 1 is a perspective view of the present device with a user's hand shown in broken lines.

With continuing reference to the accompanying drawing wherein applied reference numerals indicate parts similarly identified in the following specification, the reference numeral 1 indicates a receptacle of boxlike construction having a top wall 2, a rear wall 3, a bottom wall 4 and side walls 5. Top wall 2 is of a perforate nature by reason of rows of openings 6 while an enlarged opening at 7 consitutes the upper end of an insect passageway later described. A moveable component is indicated at 8 and serves to close the receptacle.

Extending rearwardly from back wall 3 of the receptacle is a lower arm 10 which, along with an upper arm 11, constitutes flexible arm means. An arcuate arm portion at 12 hingedly connects the arm members and normally biases upper arm member 11 to a raised position as shown in FIG. 1. Supported at the forward end of upper arm member 11 is a swatter 13 corresponding generally in area to top wall 2 of the receptacle. Swatter 13 is desirably provided with a series of openings as at 13A to lessen air resistance to swatter movement. For purposes of economical manufacture the swatter may be formed integral with the above described arm means.

Figure 2:
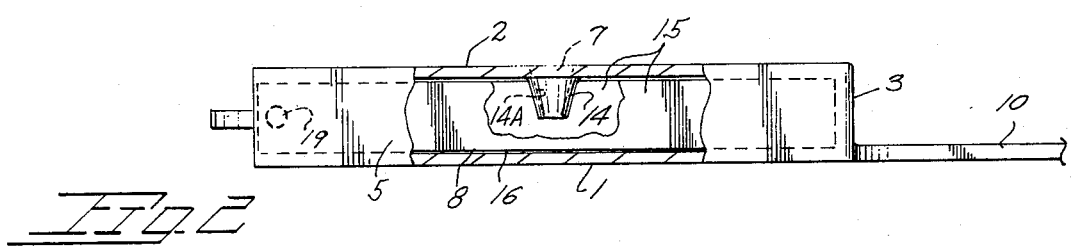
FIG. 2 is a side elevational view of the receptacle of the device.
Figure 3:
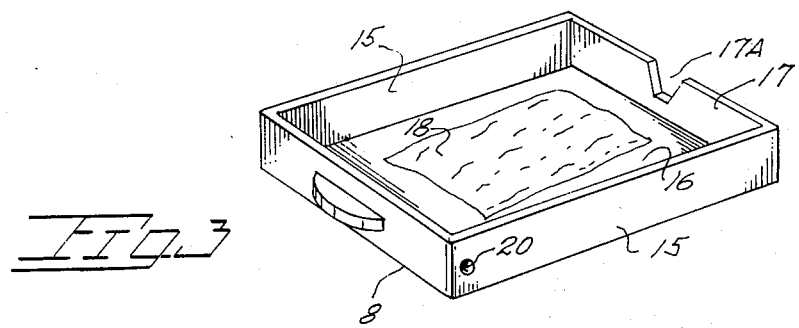
FIG. 3 is a perspective view of a tray removed from the receptacle.

With attention to FIG. 2, receptacle 1 includes an insect passageway defined by the interior wall 14A of a downwardly tapering appendage 14 to provide an insect passageway utilizing the fly trap feature of a restricted exit preventing insect re-entry. Moveable member 8 of the receptacle may be in the shape of a tray as shown in FIG. 3 having side walls 15, bottom wall 16, and a rear wall 17 which is relieved at 17A to permit rear wall passage of appendage 14. Shown in place on the tray bottom wall is a quantity of insect attractor 18 which may be in strip form as of a segment of fly paper or provided as a quantity or deposit of loose material such as sugar or any other suitable insect attracting material. If desired moveable component 8 may be in the form of a door suitably hinged to the receptacle. Nodules at 19 on the internal wall surfaces of the receptacle seat within corresponding recesses 20 on moveable component 8 to retain the latter in a closed position.

In operation, the device may be left in place to function solely as a fly trap with flies being attracted by attractor fumes escaping through the perforate top wall. Insects so attracted enter into the receptacle interior via fly trap appendage 14 which by reason of its restricted lower opening prevents insect escape. Repositioning of moveable member 8 permits periodic emptying of the receptacle and replacement of the insect attractor. If so desired, manual pressure may be rapidly applied to the arm means to forcefully urge swatter 13 against top wall 2 to destroy any insect loitering there.

While I have shown but one embodiment of the invention it will be apparent to those skilled in the art that the invention may be embodied still otherwise without departing from the spirit and scope of the invention.

Having thus described the invention, what is claimed and desired to be secured under a Letters Patent is:

1. A combination insect trap and swatter device comprising,
    a walled receptacle having a top wall defining a passageway opening for the entry of insects into the receptacle,
    swatter means disposed above the receptacle top wall and adapted for forceful contact therewith, and
    flexible arm means normally biasing said swatter means to a position above the top wall while permitting momentary closure of the swatter means against the top wall for insect killing purposes.

2. The device claimed in claim 1 wherein said receptacle includes a moveable component, said component positionable so as to discharge insects from the receptacle interior.

3. The device claimed in claim 2 wherein said top wall is of a perforate nature.

4. The device claimed in claim 3 wherein said top wall includes an appendage of truncated cone shape defining the insect passageway.

5. The device claimed in claim 2 wherein said movable component is of tray configuration within which an insect attractor may be placed.

6. The device claimed in claim 1 wherein said arm means is of unitary construction.

* * * * *